(No Model.)
W. T. VANVACTOR.
PLOW.
No. 375,516. Patented Dec. 27, 1887.
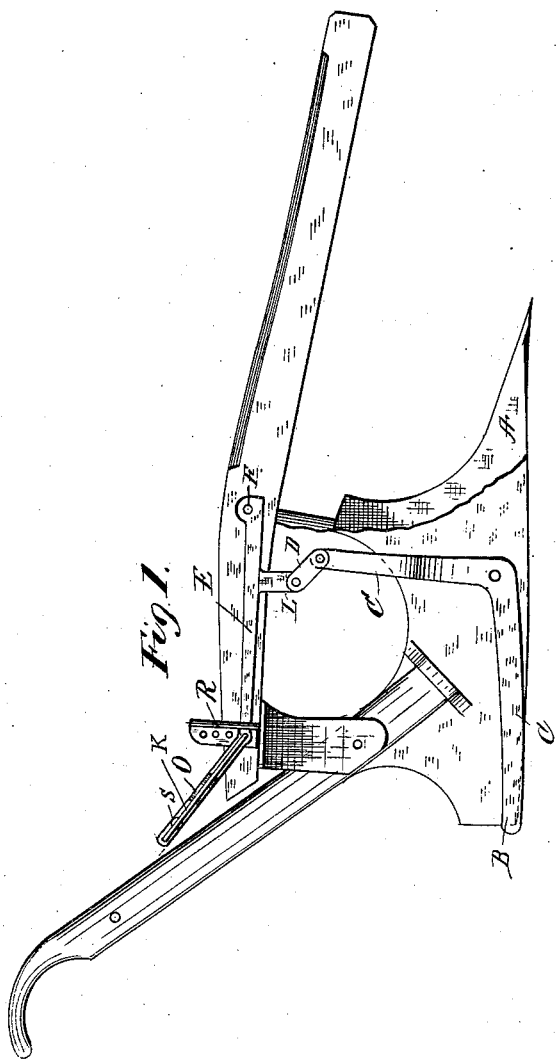
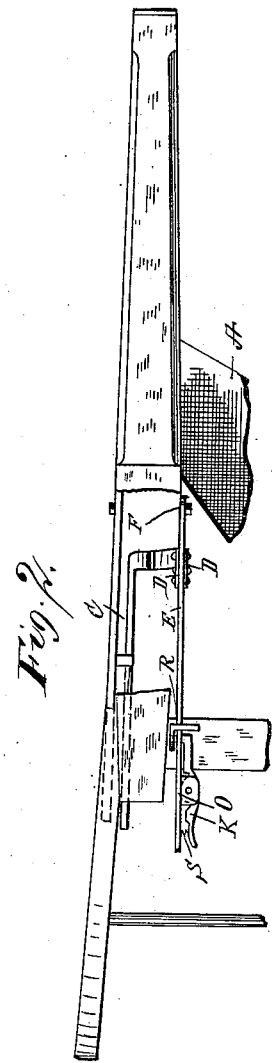
WITNESSES:
H. C. Knight.
Emma Arthur.
INVENTOR
William T. Vanvactor.
BY Knight & Bro
ATTORNEYS
N. PETERS, Photo-Lithographer, Washington, D. C.

UNITED STATES PATENT OFFICE.

WILLIAM TYNER VANVACTOR, OF ARGOS, INDIANA.

PLOW.

SPECIFICATION forming part of Letters Patent No. 375,516, dated December 27, 1887.

Application filed April 9, 1887. Serial No. 234,274. (No model.)

*To all whom it may concern:*

Be it known that I, WILLIAM TYNER VANVACTOR, a citizen of the United States, residing at Argos, in the county of Marshall and State of Indiana, have invented certain new and useful Improvements in Plows, of which the following is a specification.

Referring to the accompanying drawings, which form a part of this specification, Figure 1 is a side elevation, partly in section, of a plow with my invention applied. Fig. 2 is a plan view, also partly cut away, to show the invention more clearly.

In the drawings, A represents the landside of a breaking-plow of any of the ordinary types, and is provided with a beveled portion, B, (shown in dotted lines in Fig. 1,) upon the lower edge of its rear end, so that this portion of the plow cannot come in contact with the bottom of the furrow.

Pivoted to the side A of the plow is a bell-crank lever having a lower arm, C, which extends rearwardly in the direction of the back end of the plow, and it may or may not extend beyond the said end. This lever is provided with an upwardly-extending arm, (see Fig. 1,) which arm is indicated at C'. To the upper end of this arm is pivoted a link, D, which extends and is pivoted to a downwardly-extending lug, L, on the lever E, which latter is pivoted to the side of the plow at F. The operating branch or handle of the lever E is shown at O, and is provided with a suitable catch, K, which is adapted to be used in connection with a rack, R, arranged upon the beam of the plow. A spring, S, serves to keep the catch in place.

Other devices may be introduced without departing from the spirit of my invention, which is to construct a plow having a beveled portion, as shown, and a rearwardly-extending lever attached to the plow in the neighborhood of this beveled portion, and any suitable operating mechanism attached to this lever, whereby it may be thrust into the ground so that the point of the plow may be set at a greater angle and thus make a deeper furrow when it is so desired.

The advantages of a construction such as I have shown and described are many. It is superior to the roller which has been used in connection with plows heretofore, as it can easily be adjusted and regulated without stopping the plow, and it gives the plow as steady motion in rough as in smooth ground. Another advantage that it possesses is that it offers no obstruction in starting the plow in the ground after it has once been thrown out. It is also less troublesome in other ways, and is more durable and decreases the draft.

Having thus described my invention, what I claim as new therein, and desire to secure by Letters Patent, is—

1. The combination, with a plow, of a bell-crank lever pivoted to the side thereof, formed with a rearwardly-extending arm, C, and with an upwardly-extending arm, C', the lever E, hinged to the beam at its forward end, and a link, D, by which the upwardly-extending arm is connected with the lever, substantially as described and shown.

2. The combination, with a plow, of a bell-crank lever pivoted to the side thereof, formed with a rearwardly-extending arm, C, and with an upwardly-extending arm, C', the lever E, formed with a pendent projection, L, provided with a handle, O, and a catch, K, and hinged to the beam at its forward end, a link, D, by which the upwardly-extending arm is connected with the projection, and a rack, R, with which the catch engages, substantially as described and shown.

WILLIAM TYNER VANVACTOR.

Witnesses:
H. C. BREWER,
ERASTUS HESS.